3,006,944
HIGH TEMPERATURE OXIDATION
Merrell R. Fenske and Jennings H. Jones, State College, Pa., assignors to Esso Research and Engineering Company, a corporation of Delaware
Filed Feb. 24, 1960, Ser. No. 10,799
14 Claims. (Cl. 260—451)

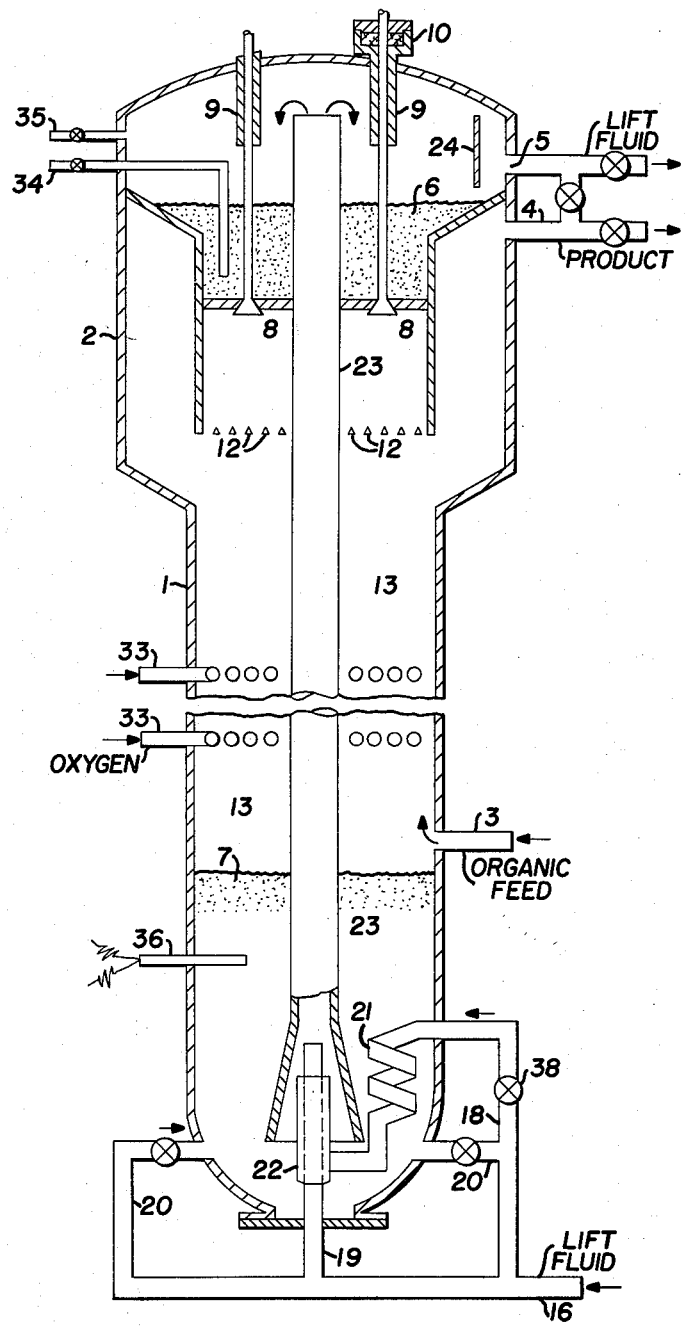
Merrell R. Fenske
Jennings H. Jones
Inventors
By *Peter H. Smolka* Attorney United States Patent Office 3,006,944
Patented Oct. 31, 1961

This invention relates to a process for making olefins or diolefins and oxygenated compounds by non-catalytic vapor phase oxidation of hydrocarbons. More specifically, it relates to a controlled oxidation of hydrocarbons such as hexane, cyclohexane, ethylbenzene, octene, naphtha, gas oil, petrolatum, etc.

This is a continuation-in-part of Serial No. 623,468, filed November 20, 1956, now abandoned.

Many different systems were proposed previously for converting organic materials such as hydrocarbons into more valuable oxygenated products by non-catalytic oxidation, provided that the reaction temperature is rigorously controlled and kept below 500° C., preferably below 450° C. However, the highly exothermic nature of oxidation reactions and their inability to be selective to forming useful materials has made it exceedingly difficult to prevent temperature runaways and excessive combustion. Patent 2,725,344 and especially U.S. Patent 2,872,472 show some of the few systems found suitable for providing the required control over the reaction.

It is an object of the present invention to provide a new source of supply for valuable olefins and diolefins such as ethylene, propylene, butadiene and higher molecular weight homologs. Another object is to provide a non-catalytic and controlled exothermic process for converting various types of methylenic materials such as paraffins, cycloparaffins, olefins, alkylated aromatics and mixtures thereof into more unsaturated compounds, especially monoolefins and diolefins, at temperatures sufficiently moderate to keep secondary reactions at a minimum. Still another object is to provide a practical dehydrogenation process that is clean and produces essentially no coke or tars.

These and other objects as well as the nature, operation and scope of the invention, will become apparent from the subsequent description and claims.

It has now been discovered that non-catalytic vapor phase oxidation can be very effective for dehydrogenating paraffinic, olefinic and alkyl aromatic hydrocarbons as well as other methylenic compounds and give good yields of more unsaturated compounds, provided that the reaction is carried out above about 500° C. and below about 750° C. but also provided that the resulting heat of reaction is quickly absorbed and removed from the reaction zone to keep the temperature at the optimum value to obtain high selectivity and high conversion per pass through the reaction zone. Multiple injection of oxygen at spaced intervals, as compared to injecting all oxygen at a single stage of the reaction, has been found helpful in repressing conversion of the feed to unwanted carbon oxides which oxide formation decreases the yield of useful products.

The required temperature control can be effected in various ways. For instance, the reaction can be carried out in a metal tube immersed in a thermostatic bath as described in U.S. Patent 2,725,344, using a suitable heat absorbing medium such as molten lead or eutectic mixtures of sodium and potassium nitrates or potassium and lithium chlorides or other materials that melt below but are stable at the desired oxidation temperature. However, because of the poor heat transfer from the gas phase to the reactor walls, the reaction tube, even when it has a relatively small cross-section does not give proper temperature control nor prevent bursts of flame at practical conversions per pass through the reaction zone. Of course, once the temperature gets out of hand, only soot, carbon dioxide and water are produced. The immersed open tube, therefore, is not readily adapted for use on an industrial scale.

A much preferred means of controlling the oxidation reaction in large scale units involves the use of relatively cool "raining" solids which remove the heat of reaction while the reaction is in progress and prevent it from reaching the inflammable stage. Thus the solids permit the safe use of larger proportions of oxygen and, thus, higher conversions in the reaction mixture than when other cooling means are employed. In this technique the reactor is essentially an open tube, except that a sufficient amount of relatively cool, finely divided inert solids is dispersed evenly across and rained down through the reaction zone together with the reactants to remove the reaction heat and maintain the desired reaction temperature. The proportion of solids needed for good temperature control amounts to from about five hundredth of a percent to about 10 percent, preferably about 0.1 percent by volume of the reaction zone, depending on the oxygen/hydrocarbon ratio, the nature of the feed, kind and size of solids, solids/oxygen ratio, etc. On the other hand, it is known that inert solid surfaces tend to inhibit oxidation and may completely arrest it if their concentration in the reaction zone becomes excessive. It is for this reason, for instance, that it has been impractical to carry out the desired non-catalytic oxidation within conventional dense fluidized beds of finely divided solids which otherwise constitute very effective heat transfer media.

The drawing shows one type of reactor particularly well suited for the desired oxidative dehydrogenation reactions, using a "rain" of solids to control the reaction temperature.

The present invention may be applied to a variety of feeds. The feed should be normally gaseous, or be an organic compound vaporizable under the reaction conditions. Preferably at least 25 or 30 weight percent of the carbon atoms in the molecule should be in the form of methylenic groups. For purposes of this description the expression "methylenic groups" is used in a generic sense and will be understood to cover methylenic groups proper, —$CH_2$—, and methyl groups, —$CH_3$—, or both. Furthermore the term "hydrocarbon feed," as used herein, includes compounds containing oxygen or nitrogen as well as hydrogen and carbon, e.g. an alcohol, and which are substantially methylenic in nature. The compounds useful as feed herein may be alcohols, ketones, amines, ethers, esters, hydrocarbons, or mixtures of the foregoing, provided that they have the specified proportion of methylenic groups. For example, the feed may be methane or preferably a $C_2$ to $C_{30}$ hydrocarbon such as ethane, propane, propylene, butane, pentane, heptane, octenes, decanes, cetane, tricontane, other chain or cyclic saturates, olefins, naphthenes, alkyl aromatics having aliphatic side chains of at least 2 carbon atoms and mixtures thereof ranging in normal boiling point from —20° or lower to 450° C. and higher. For instance, petrolatum normally boiling at 600° C. can be treated in accordance with this invention by using steam to provide volatility at the reaction temperature. Aliphatic hydrocarbons containing about 5 to 10 or more carbon atoms in a straight chain, or naphthenes possessing a five- or six-membered ring, e.g., cyclopentane, methylcyclopentane, cyclohexane, dimethyl cyclohexanes, Decalin, or various naphthas or other mixtures are particularly suitable. While simple aromatics and aromatics without substantial methylenic-type appendages, i.e. lower than ethyl, e.g. compounds such as benzene, toluene, and highly nucleated aromatics, such as naphthalene, are not the preferred feed stocks for this type of oxidation, alkylated aromatics such as ethylbenzene, isopropylbenzene and diisopropylbenzene are highly suitable feeds.

Aside from the foregoing, other eminently suitable feeds include aliphatic alcohols, especially $C_4$ to $C_{10}$ and higher, such as butanol-1, octanol-1, tridecyl alcohol (such as that produced by oxonation of $C_{12}$ olefins), etc.; also, carbonyls of ketones of a similar range of carbon atoms, e.g., hepatanone-2; and so forth. Oxy-compounds as obtained in this type of oxidation, as well as those obtained in Fischer-Tropsch syntheses, are other suitable feed stocks.

If the feed is easily condensable or liquefiable, such as when oxidizing substances boiling above —20° C., the reaction products usually comprise three phases, i.e., a gas or non-condensible portion, a liquid aqueous phase, and a liquid organic phase.

A high degree of conversion, e.g., from 25 to 85% per pass, is an important feature of this invention. Generally speaking, as the degree of conversion is increased, increasing amounts of diolefins are produced in addition to mono-olefins, even when using paraffin hydrocarbons as feeds. The desired high hydrocarbon conversion can be accomplished by injecting oxygen, usually at a multiplicity of points, into the reaction zone in total amounts exceeding 0.3 mole per mole of oxidizable feed, or by partial recycling of the conversion products. In most cases the oxygen/hydrocarbon mole ratio will be in the range between about 0.5 to 5, depending on the molecular weight of the feed and desired conversion. Generally speaking, the lower molecular weight compounds will require relatively high oxygen/hydrocarbon mole ratios for a comparable degree of conversion. Excessive oxidation or degradation into oxides of carbon is prevented or minimized by the heat control technique of this invention which assures a high rate of heat removal, short contact time, and uniform flow without back mixing or internal recycling such as occurs in dense fluidized beds.

The oxidant is preferably oxygen, but it may be air, enriched air, ozone, or other oxygen-containing gas, such as a mixture of oxygen and steam. The various vaporous feed stocks oxidize with different rates, and the temperatures to initiate reaction are different, but easy to determine. If the reaction tends to be too fast or violent, it is frequently better to use an oxygen-diluted oxidant such as air, or oxygen-steam mixtures. Of course, the use of gaseous diluents is avoided where possible, in order to keep the size and complexity of the gaseous recovery system at a minimum.

The pressures used may range from about 0 to 5 p.s.i.g. to about 100 or 200 p.s.i.g. The pressure selected depends on the reactivity of the material being oxidized, increased pressures being advantageous when oxidizing the more resistant feeds such as highly branched paraffins, lower alkylated aromatics, or those more highly nucleated, and on the desired extent of recovery of the normally gaseous products. For example, it may or may not be desirable to recover such lower olefins, aldehydes and oxides of carbon as may be present in the gaseous products. Pressure on the reactor helps the recovery of such gases, since the effluent gases then do not have to be separately compressed for the recovery step.

The reaction temperatures used are above 500° C. and below 750° C., usually in the range between about 520° to 650° C. Outstanding yields of unsaturated products are obtained at temperatures of 520° to 590° C.

For instance, in a typical case the solids may be at a temperature of perhaps 400° to 550° C. when injected into the reaction zone but the maximum temperature in the reaction zone may be 20° to 100° C. higher than the initial temperature of the solids.

The actual time required to react oxygen with the vaporous feed is short, usually a few seconds or fraction of a second. However, since the desired oxidation products are usually stable thermally for at least a few seconds at the reaction temperatures involved, the residence time in the reactor may range from one second upward, e.g., 3 to 10 or 20 seconds. Of course, it is imperative that the temperature be kept within tolerable limits throughout the reaction zone and it is desirable to remove the reaction products as rapidly as possible.

The solids used in the reactor to control the reaction and pick up the reaction heat may be silicious or aluminiferous materials such as Ottawa sand, glass beads, spent clays, quartz, fused alumina, mullite, coke, and the like. These solids are essentially inert toward the feed stock, i.e., they are not needed as catalysts to initiate the oxidation reaction. Their purpose is to moderate the reaction zone with respect to temperature, to prevent the formation of local hot spots, to slow down and spread out the active reaction zone, and to assimilate the heat of reaction so that this heat can, in turn, be removed from the solids in another operation. They may be fed to the reaction zone in a ratio of about 5 to 50 lbs. per pound of hydrocarbon feed, e.g., 5 to 35 lbs./lb. Increasing solids concentrations and large amounts of surface in particular tend to slow down the reaction and may promote the formation of carbon dioxide at the expense of more desirable products. In general, the individual size and shape of the solid particles are such that they can be fluidized, but they should not be so small that they are readily entrained in the gases, or such that they are not amenable to separation from the reaction gases by conventional solid-gas separators such as cyclones. They should also resist attrition. The size of the solid particles usually ranges from about 50 to 2000 microns. Particles of 100 to 300 microns show low entrainment in the gas as well as good flow features and may therefore be preferred. The size of the particles may in some instances constitute a useful process variable since some of the relatively difficult oxidations, such as that of ethane or n-butane, can be performed satisfactorily with solids having a particle size of 250 or 300 microns whereas an equal weight of smaller particle sizes tends to inhibit or retard the reaction unduly, presumably because of the increased amount of surface area present. Conversely, a relatively small particle size may be preferred in the case of easily oxidizable hydrocarbons when one desires to slow down the reaction. Coarse solids also permit higher gas velocities and hence shorter gas residence time in the reactor.

Referring to the drawing, a suitable reactor may consist of a vertical cylindrical shell reaction chamber 1 and an expanded top 2, fabricated to withstand temperatures up to about 750° C. and pressures to about 200 to 400 p.s.i.g. It is provided with openings, 3, 4 and 5. In the upper part of the expanded section 2 is a fluidized, or partially fluidized bed 6 of fused alumina or similar inert solids, and a similar bed of the same solids exists at the bottom, 7. Solids in upper bed 6 are metered by one or more valves 8. The solids thus can be fed and flow downward, under essentially free-fall conditions into space 13. About 25 pounds of fused alumina, of about 300 micron particle diameter, for instance, can thus be "rained" downward countercurrently to the ascending reaction gases per pound of feed stock introduced through inlet 3. These falling solids impinge on grid 12 which serves to break up clusters of the solids and disperse them still more so they are able to "rain" or fall down throughout reaction space 13 in a highly dispersed, uniformly distributed manner. The solids collect at the bottom of the reactor to form a dense bed 7. The upward linear gas velocity in the reaction space is desirably in the range of about 0.5 to 10 ft./sec., e.g., 3 ft./sec.

Vaporized normal hexane, or other material, e.g. ethylbenzene or cyclohexane, to be oxidized, is introduced into reaction chamber 1 through feed line 3. If desired, part of the feed may be introduced directly into bed 7 to increase fluidization or to produce feed preheating or vaporization. Steam or some other stable fluid is introduced through lines 16 and 19 and nozzle 22 to lift the solids through line 23 which is preferably flared at the bottom. A part of the lift fluid is introduced into the fluidized bed 7 via lines 20 to keep the bed fluidized. Also, especially if a liquid or partially liquid lift medium such as water or wet steam is used, it can be sent through line 18 and coil 21 to be vaporized and preheated while thus simultaneously cooling bed 7. Of course, when the feed itself is sufficiently stable, it may be used as the lift fluid instead of any extraneous material.

At the top of pipe 23 the solids are disengaged from the lift vapors and fall downward to constitute bed 6. The vapors emerging from the top of pipe 23 flow around baffle 24 and out through opening 5. A high degree of separation efficiency is usually not necessary since both the solids and the vapors eventually pass from the top of the reactor into reaction space 13. However, a cyclone may be used, if desired, to separate entrained solids from the vapors leaving through pipe 5.

The hot fluidized solids entering the flared base of pipe 23 vaporize any liquid introduced via line 19. In this way the solids are cooled and the necessary vapors are generated to propel the solids up through lift pipe 23. Nozzle 22 serves to aspirate the solids into the base of pipe 23.

As mentioned before, the feed to be oxidized enters the reaction chamber vessel 1 at inlet 3 and flows upward through reaction space 13. In this way it flows countercurrently to the descending dispersed "rain" of particulate solids issuing around valves 8 and passing downward through grid 12. During their fall through chamber 1 and reaction space 13 these solids rapidly pick up the heat generated in space 13.

Oxygen enters pipes 33 which are placed from 1 to 5 feet apart along the vertical length of reaction zone 13. These pipes comprise substantially uniplanar coils, and have a large number of holes or slots on their underside so the oxygen can be distributed uniformly throughout the whole cross section of vessel 1. These coils 33 also serve to redisperse and redistribute the raining solids.

At or near oxygen inlet coils 33 the reaction of the oxygen and vaporous feed fast occurs. The heat thereby liberated has to be promptly assimilated, or reaction temperatures rise to intolerable levels. The raining, relatively cool solids accomplish this quickly because of their intimate contact with the entire body of reacting gases.

Multiple oxygen injection is used to further control the reaction. That is, the oxygen is added in relatively small increments so it can react, and the heat of reaction can be absorbed by the solids, before the next increment of oxygen is added. By thus keeping the local mole ratio of oxygen to hydrocarbon between about 0.1 and 0.5, overall mole ratios of oxygen to feed as high as 5 can be employed.

The vaporous reaction products flow upward through enlarged section 2 where the gas velocity is decreased to allow entrained solids to drop back into chamber 1. The vapors then leave via line 4, are combined with the lift gas and recovered in a system such as that shown in FIGURE 2 of U.S. Patent 2,872,472. Of course, in commercial practice it may be preferred to recover the oxidized product separately from the lift gas.

The following description relates to the control of the oxygen, the feed stock, the solids streams, and of the reaction heat.

The solids in upper bed 6 desirably are at as low a temperature as possible to facilitate rapid cooling of the gases, but usually hot enough to permit establishing the desired reaction temperature in reaction space 13. For instance, the solids in bed 6 may be at 400° to 450° C., and become heated up to the desired reaction temperature by the time they reach the active oxidation zone.

The level of bed 6 may be controlled and kept substantially fixed by sensing pipes 34 and 35. A small amount of inert gas is introduced continuously into these pipes. The difference in the gas pressure between pipes 34 and 35 is proportional to the depth of solids in bed 6. If the bed exceeds the desired depth, the increased gas pressure in pipe 34 operates a pilot valve which in turn operates a conventional or hydraulic cylinder (not shown) attached to the upper end of valves 8 to move them up and down.

The temperature of lower bed 7 is measured by thermocouple 36. This measurement can be used to control the proportion of the lift medium which is allowed to pass through coil 21 so as to effect the necessary amount of cooling.

The oxygen fed to coils 33 is likewise controlled to comprise the desired oxygen-to-feed molal ratio, e.g., 0.8 total, injected in four equal increments.

The temperature of bed 6 is controlled in part by the proportions of lift gas and solids flowing through lift pipe 23, by the amounts of liquid lift medium flowing through line 19 and to vaporizer 21, and by the temperature of bed 7. Valve 38 may be used to apportion the flow of vaporizable liquid through vaporizer 21. If desired, an additional heat transfer coil may be positioned in bed 6 or bed 7 or both to provide further heating or cooling. Such cooling may be particularly appropriate when a normally gaseous lift medium is being used.

While the foregoing description relates to the preferred operation involving countercurrent flow of feed vapor and solid, the illustrated apparatus can also be operated with concurrent flow. In such event, the feed is introduced through opening 4 and passed downward through reaction space 13 concurrent with the solids falling through grids 12, the product being withdrawn through line 3. In this case the temperature of the solids in bed 6 is maintained at about 500° C. and heat of reaction is preferably taken out not only in dense beds 6 and 7, but also by cooling coils (not shown) positioned in reaction space 13, in order to prevent the reaction temperature from exceeding the permissible maximum. However, while a "raining solids" reactor is preferred, horizontal and vertical reactors in which the solids are blown through the reaction zone in a dispersed state may likewise be employed. For example, a concurrent horizontal reactor can be used in which the solids and reactants flow in the same direction provided that the solid particles are evenly dispersed in the reactants so there is a concentration of about 0.05 to 10 volume percent of solids per volume of reaction space.

The following examples will further illustrate the nature and advantages of this invention. In the absence of contrary indications, ratios and percentages of materials are expressed on a weight basis.

EXAMPLE 1 n-Hexane was oxidized at atmospheric pressure in comparative runs in the apparatus shown in the drawing. One run was carried out at an average reaction temperature of 390° C. while in the other the reaction temperature averaged 565° C. The pertinent data are summarized in Table I.

Table I
OXIDATION OF HEXANE

| Run No. | 1 | 2 | 3 |
|---|---|---|---|
| Average reaction temperature, °C | 390 | 565 | 575 |
| Oxygen/hexane mole ratio | 0.75 | 0.75 | 1.7 |
| Number of O₂ injection points | 4 | 4 | 4 |
| Contact time, seconds | 6 | 6 | 6 |
| Solids (particle size) | (¹) | (¹) | (¹) |
| Solids, rate, lbs./lb. of HC feed | 21.8 | 31.6 | 37 |
| Feed conversion, percent | 50 | 66 | 82 |
| Oxygen conversion, percent | 99.6 | 97.8 | 97.6 |
| Oxygen consumption, lbs./100 lb. hexane reacting | 56 | 41 | 77 |
| Duration of run, minutes | 270 | 270 | 240 |
| Produces, lbs./100 lbs. hexane reacted: | | | |
| Ethylene | | 17.8 | 20.4 |
| Propylene | 13.3 | 14.2 | 14.5 |
| Butenes | | 13.8 | 10.5 |
| Pentenes | | 8.6 | 4.0 |
| Hexenes | 12.1 | 5.3 | 2.8 |
| Total olefins | 25.4 | 59.7 | 52.2 |
| Total liquid oxygenated organic compounds | 61.4 | 14.1 | 9.7 |
| Methane | 5.4 | 10.7 | 11.0 |
| CO | 13.9 | 12.4 | 23.2 |
| CO₂ | 3.0 | 9.4 | 28.4 |

¹ Fused alumina beads (300-micron diameter).

The data show that at a lower temperature the oxygenated organic materials, known to be mostly $C_6$ epoxides plus some water-soluble carbonyl and hydroxyl compounds, constitute the principal reaction product, in addition to which an appreciable proportion of the hexane feed is converted to hexene by simple dehydrogenation. However, only a relatively small amount of valuable $C_2$–$C_4$ olefins is produced, that is, the predominating reaction products contain the same numer of carbon atoms per molecule as the feed.

By contrast, at the higher temperature the yields of oxygenated liquid material as well as hexane are comparatively low, whereas ethylene, propylene and butylenes are produced in quite substantial amounts. Based on hexane actually converted, the yield of the $C_2$–$C_5$ olefins is about four times greater at the higher than at the lower temperature; considering the materially higher conversion obtained at the higher temperature, this increase in lower olefin production is even greater when expressed in terms of total feed.

It is also significant to note that while the hydrocarbon conversion was substantially increased at the higher temperature, the oxygen consumption per converted feed was actually decreased, i.e. an increased amount of the hydrocarbon feed was converted into other types of hydrocarbons rather than into oxygenated products.

Comparing runs 2 and 3, it is apparent that under otherwise similar conditions an increased ratio of oxygen to hydrocarbon feed can bring about a substantial increase in feed conversion and also an increased yield of the $C_2$–$C_3$ olefins, notably ethylene, at the expense of the higher olefins.

EXAMPLE 2

Ethane, propane and n-butane were similarly oxidized at atmospheric pressure while dropping fused alumina beads of 250 micron diameter through the reaction zone at a rate of about 30 pounds per pound of hydrocarbon feed. The principal data are summarized in Table II.

Table II
OXIDATION OF C₂-C₄ HYDROCARBONS

| Run No. | 4 | 5 | 6 |
|---|---|---|---|
| Hydrocarbon oxidized | Ethane | Propane | n-Butane |
| Hydrocarbon conversion, percent | 28 | 50 | 50 |
| Oxygen/HC mole ratio | 0.4 | 0.8 | 0.8 |
| Average reaction temp., °C | 590 | 525 | 545 |
| Products, lbs./100 lbs. of hydrocarbon reacting: | | | |
| Ethylene | 75.0 | 23.2 | 19.5 |
| Propylene | | 27.5 | 7.8 |
| Butenes | | | 23.4 |
| Saturates (mostly CH₄) | | 28.9 | 12.9 |
| Liquid oxygenated compounds | | | 11.5 |
| CO | 21.0 | 10.2 | 6.6 |
| CO₂ | 64.0 | 51.6 | 54.7 |

It is noted that in each case more than half of the hydrocarbon reacting was converted into valuable olefins; in the case of ethane 75% of the converted feed was actually recovered as ethylene. By contrast, at temperatures below 500° C. non-catalytic oxidation of ethane does not proceed to any appreciable extent.

EXAMPLE 3

Cetane (n-hexadecane) was oxidized in the "raining solids" reactor at atmospheric pressure at two different temperatures, and with different proportions of oxygen. The results are summarized in Table III.

Table III
OXIDATION OF CETANE

| Run No. | 7 | 8 | 9 |
|---|---|---|---|
| Average reaction temp., °C | 360 | 520 | 550 |
| Oxygen/cetane mole ratio | 0.56 | 0.49 | 1.32 |
| Oxygen consumption, lbs./100 lbs. cetane reacted | 24.7 | 15.3 | 24.4 |
| Cetane conversion, percent | 32 | 45 | 78 |
| Production, lbs./100 lbs. of cetane reacted | | | |
| Products: | | | |
| Ethylene | | 9.1 | 12.1 |
| $C_3$–$C_5$ (inclusive) olefins | 7.1 | 17.1 | 23.4 |
| $C_6$–$C_{10}$ (inclusive) olefins | 13.9 | 42.6 | 20.8 |
| $C_{11}$–$C_{16}$ (inclusive) olefins | 6.4 | | 11.1 |
| $C_4$ and $C_5$ diolefins | | 1.5 | 2.9 |
| Carbonyls $C_2$–$C_4$ (inclusive) | 1.3 | 3.9 | 3.3 |
| $C_{16}$-epoxides+some ketones and higher b.p. material | 58.8 | | |
| Oxygenated material below cetane | | 6.3 | 8.6 |
| Oxygenated material in water layer | 5.6 | 1.4 | 1.5 |
| CO | 4.4 | 2.7 | 6.0 |
| CO₂ | 1.0 | 1.7 | 6.4 |
| Methane | 2.2 | 6.1 | 5.5 |
| Total pounds of olefins and diolefins | 27.4 | 70.3 | 70.3 |
| Total pounds of liquid organic oxygenated material | 65.7 | 11.6 | 13.4 |

It is noted that at the relatively low temperature of run 7 there is a large yield of oxygenated products, notably epoxides boiling between about 320° and 370° C. and having the same number of carbon atoms as the feed, while only a relatively small amount of monoolefins is produced and diolefins are virtually undetectable. By contrast, at temperatures above 500° C. the olefins constitute the major product, i.e., dehydrogenation becomes the predominant reaction. Ethylene, propylene and higher olefins up to those containing the same number of carbon atoms as the feed are obtained in valuable yields.

In run 9 the yield of propylene amounted to about 6 pounds per 100 lbs. of cetane reacted, i.e., propylene constituted about 25% of the $C_3$–$C_5$ product fractions, most of which was composed of butenes. Further, by comparing runs 8 and 9 it is seen that as more and more oxygen is supplied to and used in the reaction, i.e., as the degree of oxidation is increased, the conversion of cetane is increased, the production of ethylene and the other $C_2$–$C_5$ olefins is increased somewhat at the expense of the higher olefins, and the production of valuable $C_4$ and $C_5$ diolefins is also increased significantly while the formation of unwanted oxides of carbon and methane is not affected too greatly. Based on total cetane feed in a once-through operation, more than twice the amount of ethylene and other lower olefins and almost four times the amount of $C_4$ and $C_5$ diolefins were produced in run 9 than in run 8. Also, while the epoxides in run 7 were mainly $C_{16}$ compounds, the epoxides isolated in the high temperature runs were mainly of a lower molecular weight, to the essential exclusion of any $C_{16}$ epoxides.

In the absence of oxygen, cetane undergoes cracking to the extent of only about 12 percent at similar temperatures and contact times. Thus, the oxidation reaction is responsible for the relatively high conversion. On the basis of infrared examination of the $C_6$, $C_7$, $C_8$ and $C_9$ hydrocarbon product fractions, these hydrocarbons consisted almost exclusively of alpha olefins, some diolefins, but no saturated hydrocarbons were found. On the basis of bromine number data, the hydrocarbon products in the $C_{10}$ to $C_{15}$ range also consisted entirely of olefins, presumably all alpha type. The only saturated hydrocarbon produced was methane.

EXAMPLE 4

Instead of pure compounds it is possible to use various vaporizable petroleum fractions such as naphthas or gas oils as oxidation feed. This is illustrated by the following run wherein a virgin gas oil was oxidized at atmospheric pressure in accordance with this invention. The gas oil feed had the following properties:

API gravity _____ 35.4
D1160 distillation:
    I.B.P. _____ °F__ 357
    50% at _____ °F__ 607
    F.B.P. _____ °F__ 668
Bromine No _____ 2
Soluble in 95% $H_2SO_4$ _____vol. percent__ 13
Soluble in 85% $H_3PO_4$ _____do____ 3

The oxidation data are summarized in Table IV.

Table IV
OXIDATION OF GAS OIL

| Run | 10 |
|---|---|
| Average reaction temp., °C | 545 |
| $O_2$/feed mole ratio (based on $O_2$ conversion) | 1.83 |
| Number of points of oxygen injection | 4 |
| Contact time, seconds | 9 |
| Feed conversion, percent | 85.6 |
| Oxygen conversion, percent | 97.1 |
| Solids used, ave. diameter, fused alumina, microns | 300 |
| Solids rate, lbs./hr | 47.6 |
| Temperature of entering solids, °C | 542 |
| Maximum temp. in reaction zone, °C | 555 |
| Feed rates: | |
|   Gas oil, g./hr | 609 |
|   Oxygen, g./hr | 145 |

SUMMARY OF THE PRODUCT COMPOSITION AND PRODUCTION DATA FOR THE VAPOR PHASE OXIDATION AT 545° C. OF GAS OIL

| Products | Prod., lbs./100 lbs. of gas oil | | Boiling range °C. |
|---|---|---|---|
| | Feed | Reacting | |
| Hydrocarbons: | | | |
|   Unreacted feed | 14.4 | | |
|   Hydrogen | 0.1 | 0.1 | |
|   Methane | 4.9 | 5.8 | |
|   $C_3+C_4$ saturates | 0.7 | 0.8 | |
|   Ethylene | 6.4 | 7.5 | |
|   $C_3+C_4$ olefins | 13.1 | 15.4 | |
|   Butadiene | 1.3 | 1.5 | |
|   $C_5+C_7$ olefins | 7.1 | 8.3 | |
|   $C_8+C_9$ olefins | 2.0 | 2.3 | 96–204 |
|   $C_{10}+C_{11}$ olefins | 6.4 | 7.5 | |
|   $C_{12}$ olefin | 0.6 | 0.7 | 204–288 |
|   $C_{13}$ to $C_{15}$ olefins | 3.3 | 3.9 | |
|   $C_{16}+C_{17}$ olefins | 3.1 | 3.6 | 288–358 |
|   $C_{18}$ to $C_{20}$ olefins | 1.5 | 1.8 | |
| Totals | 64.9 | 59.2 | |
| Oxygenated materials: | | | |
|   CO | 2.5 | 2.9 | |
|   $CO_2$ | 9.5 | 11.1 | |
|   Total water layer chemicals ($C_1$–$C_3$ aldehydes plus methanol) | 1.9 | 2.1 | |
| Organic layer chemicals: | | | |
|   Acetaldehyde | 1.2 | 1.4 | |
|   Oxy. cpds., B.P. 39° to 60° C | 1.7 | 2.0 | |
|   $C_6$ oxy. cpds. | 1.4 | 1.6 | 60–220 |
|   $C_7$ to $C_{11}$ oxy. cpds | 3.4 | 4.0 | |
|   $C_{12}$ to $C_{16}$ oxy. cpds | 2.0 | 2.4 | 220–316 |
|   $C_{17}$ to $C_{18}$ oxy. cpds | 4.8 | 5.6 | 316–382 |
|   $C_{19}$ to $C_{21}$ oxy. cpds | 2.0 | 2.3 | 382–410 |
|   Other higher oxy. cpds. (residue) | 8.3 | 9.7 | |
| Totals | 38.7 | 45.1 | |

TOTAL ORGANIC LAYER (HYDROCARBONS AND OXY-COMPOUNDS)

| | |
|---|---|
| Solubility in 95% $H_2SO_4$, vol percent | 72 |
| Solubility in 85% $H_3PO_4$, vol percent | 31 |
| Bromine number | 95 |

It is thus apparent that the gas oil can be profoundly altered in a single pass oxidation giving a product distribution somewhat similar to that obtained in oxidizing cetane at like temperatures. A comparison of the bromine numbers and acid solubilities of the organic layer product with the corresponding characteristics of the feed is indicative of the greatly increased unsaturation of the product. The total products consisted largely of $C_2$ to $C_{21}$ olefins, together with some oxygenated organic compounds of the same carbon atom range, some unreacted feed (14% of original), and carbon oxides. About 14% of the feed was converted to oxides of carbon, about 5% to methane, and a still smaller proportion was converted to oxygenated material forming a water layer. About 50% of the oxygenated organic compounds consisted of carbonyls, the remainder seemingly being composed of epoxides.

The data also show that a very substantial proportion of the gas oil is converted to gasoline-range products. When low-boiling olefins and oxygenated organic compounds are included as potential gasoline products, then about 46 lbs. of gasoline range or potential gasoline are formed. In addition about 14 lbs. of unreacted gas oil, 8.5 lbs. of high boiling hydrocarbons and 17 lbs. of high boiling oxygenated compounds are formed. If all these high boiling materials are recycled to extinction, then for each 100 lbs. of gas oil reacted about 76.5 lbs. of gasoline range and lower boiling product are formed. Of this material about 20% is comprised of oxygenated material and another 25 to 30% of ethylene and propylene, which may be more valuable as petrochemicals than as fuel.

The oxidation of gas oil proceeded smoothly, without any evidence of tar or carbon formation either on the reactor, product line surfaces, or on the circulating solids. In fact, in all the high temperature oxidation runs the reactor wall surfaces and the solids have been perfectly clean and the products clear and only slightly colored.

EXAMPLE 5

Cyclohexane and octene-2 also have been reacted with oxygen at high temperature in accordance with this invention and gave olefins as the major reaction products, whereas at lower temperature such as 400° C. these compounds were previously oxidized to give principally epoxides, carbonyls and other oxy compounds. The results of the high temperature oxidations are summarized in Table V.

Table V
OXIDATION OF CYCLOHEXANE AND OCTENE-2

| Run No | 11 | 12 |
|---|---|---|
| Feed | Cyclohexane | Octene-2 |
| Average reaction temp., °C | 565 | 565 |
| Oxygen/feed mole ratio | 0.75 | 0.78 |
| Oxygen consumption, lbs. of oxygen/100 lbs. of hydrocarbon reacting | 52.2 | 32.8 |
| Feed conversion, percent | 55 | 68 |

PRODUCTION, LBS./100 LBS. OF HYDROCARBON REACTING

| Products: | | |
|---|---|---|
|   Ethylene | 9.6 | 13.1 |
|   $C_3$–$C_5$ (inclusive) olefins | 6.5 | 21.3 |
|   Butadiene | 8.2 | 3.6 |
|   Piperylene | 2.6 | 4.9 |
|   Cyclohexene | 8.6 | |
|   Cyclohexadiene | 3.8 | |
|   $C_6$–$C_7$ olefins, diolefins, aromatics, etc. | 6.9 | 11.1 |
|   Oxygenated compounds in organic layer | 15.1 | 18.9 |
|   Oxygenated compounds in water layer | 7.6 | 5.9 |
|   CO | 15.0 | 8.9 |
|   $CO_2$ | 11.6 | 9.5 |
|   Methane | 4.8 | 7.7 |
|   Total olefins, diolefins, and other hydrocarbons | 46.2 | 57.1 |
|   Total liquid organic oxygenated compounds | 22.7 | 21.7 |

It is apparent that the olefin feed of run 12 gives considerable proportions of $C_4$ and higher diolefins as products, as well as a good yield of ethylene and other valuable olefins, including octadiene. The cyclohexane also gave good yields of ethylene and higher monoolefins; some diolefins, especially cyclohexadiene-1,3; a considerable amount of cyclohexene, a significant amount of benzene (about 3 lbs. per 100 lbs. converted); and additionally also various oxygenated organic compounds such as formaldehyde, acetaldehyde, 1,4-epoxy cyclohexane and other epoxides and higher boiling oxygen-containing material.

EXAMPLE 6

This type of high temperature oxidation may also be used for upgrading naphthas. This is shown by the data in Table VI which summarizes the oxidation of two different feeds, each oxidized at a temperature of about 550° C. and, for comparative purposes, also at about 380° C. Runs 13 and 14 were made with an Arabian light virgin naphtha (B.R. $C_6$–200° F.; research octane No., clear, 54.0), while runs 15 and 16 were made with a hydroformate (B.R. $C_6$–400° F.) made from a 200° to 400° F. Arabian virgin naphtha.

*Table VI*

OXIDATION OF NAPHTHA

| Run No | 13 | 14 | 15 | 16 |
|---|---|---|---|---|
| Feed | (1) | (1) | (2) | (2) |
| Ave. reaction temp., °C | 384 | 550 | 378 | 560 |
| $O_2$/HC mole ratio | 1.5 | 1.0 | .50 | 0.53 |
| Solids ("Mullite") | (3) (4) | (3) (4) | (3) (5) | (3) (5) |
| Solids rate: | | | | |
| Lbs./hr | 60 | 56 | 60 | 50 |
| Lbs./g.—mole $O_2$ | 10 | 13 | 10 | 16 |
| Feed conversion, percent | 60 | 55 | | |
| Products, pounds per 100 pounds of feed: | | | | |
| Liquid organic layer ("A"), stabilized to room temperature: | | | | |
| Unreacted feed | 40.0 | 47.0 | | |
| Olefins | 6 6.8 | 6 5.6 | | |
| Oxygenated compounds | 13.0 | 6.0 | | |
| Light ends ("C"), mostly $C_4$ olefins | 0 | 7.2 | 0 | 2.2 |
| Organic material ("B"), from water layer after hydrogenation over nickel at 50° C. and 1000 p.s.i.g.: | | | | |
| $C_1$–$C_3$ alcohols, etc. (B.R. 60–90° C.) | 15.6 | 2.0 | 3 | 1.5 |
| Material boiling above 100° C | 6.0 | | | |
| Ethylene | 1.5 | 7.2 | 0.4 | 2.7 |
| Propylene | 1.5 | 5.0 | | |
| CO | 16.8 | 5.5 | 2.8 | 2.2 |
| $CO_2$ | 4.9 | 14.5 | 1.4 | 10.0 |
| $C_nH_{2n+2}$ (gas) | 1.6 | 4.4 | 0.23 | 1.0 |
| (n of above) | (2.4) | (1.2) | | |
| Total C+H in non-cond. gas | 13.2 | 23.0 | 2.3 | 7.4 |
| Yield data, percent of feed: | | | | |
| Liquid product "A" | 59.8 | 58.6 | 94.4 | 85.0 |
| Gasoline range of "A" | 59.8 | 58.6 | 84.8 | 82.8 |
| Liquid product "B" | 15.6 | 2.0 | 3.0 | 1.5 |
| Total "A" plus "B" (gasoline range) | 75.4 | 60.6 | 87.8 | 84.3 |
| (Res. octane number, clear) | 82.3 | | | |
| Properties of liquid "A": | | | | |
| Carbonyls (g. $O_2$/100 g.) | 2.0 | 0.5 | 1.7 | 1.2 |
| Bromine number (g. $Br_2$/100 g.) | 7 47 | 7 41 | 25 | 78 |
| Vol. percent sol. in 95% $H_2SO_4$ | 32 | 20 | 77 | 77 |
| Vol. percent sol. in 85% $H_3PO_4$ | 22 | 10 | | |
| Density at 60° F | 0.730 | 0.707 | 0.845 | 0.787 |
| Properties of water layer product (before hydrogenation) carbonyls (g. $O_2$/100 g.) | 2.0 | 0.2 | 2.7 | 0.0 |

1 Arabian LV naphtha.
2 Arabian hydroformate.
3 Fused alumina.
4 250 microns.
5 300 microns.
6 Values based on solubility data (lower than true values).
7 After stabilization to room temperature (i.e., after removal of light olefins).

The data show clearly that production of olefins, especially ethylene and propylene, is several times greater at temperatures above 500° C. than below, whereas the amount of oxygenated products is very much greater at the lower temperature, especially in the case of virgin naphthas. A comparison of the bromine numbers in runs 15 and 16 further shows that the high temperature run also produced a decidedly more unsaturated naphtha product. In run 14 a relatively low bromine number was obtained due to the fact that a large proportion of the lighter olefins was lost from the sample before its unsaturation was determined. The boiling characteristics of the Arabian hydroformate and of the oxidized products obtained therefrom are also of interest and are summarized herewith:

| Boiling pt., °F. | Feed | Weight percent distilled | |
|---|---|---|---|
| | | Product from Run 15 | Product from Run 16 |
| <86 | 1 | 5 | 7 |
| 150 | 12 | 12 | 40 |
| 220 | 29 | 32 | 54 |
| 266 | 44 | 47 | 63 |
| 310 | 73 | 70 | 80 |
| 338 | 89 | 83 | 90 |
| 356 | 95 | | 92 |
| 392 | F.B.P. | 86 | 97 |
| 438 | | | F.B.P. |
| 660 | | F.B.P. | |

It will be noted that the low temperature oxidation product has a distillation curve, the lower end of which is quite similar to that of the feed hydroformate, but the former has a relatively large proportion of compounds boiling above the feed range and found to be aromatic in nature. The high temperature oxidation product, on the other hand, has considerably more light ends than the feed. A comparison of the oxidation behavior of the virgin naphtha with that of the hydroformate also shows that the virgin naphtha was far more susceptible to oxidation and accordingly gave much greater yields of ethylene, water layer products, etc. than the relatively more aromatic hydroformate. This, of course, illustrates the fact that aromatic hydrocarbons are not particularly advantageous oxidation feeds for ethylene manufacture or the like. However, as shown by the drastically increased bromine number, even the hydroformates can be beneficially upgraded by oxidation above 500° F.

EXAMPLE 7

A normally solid petrolatum has also been successfully converted in accordance with this invention. The petrolatum used had the following inspection data:

| | |
|---|---|
| Gravity, °API | 36.2 |
| Flash, COC, °F | 495 |
| Viscosity at 210° F., SSU | 50 |
| ASTM Pet. M.P., °F | 140.5 |
| Oil, wt. percent/SBA at 0° F | 28.4 |
| Dietert sulfur, wt. percent | 0.11 |
| Distillation at 10 mm. Hg, °F.: | |
| I.B.P | 528 |
| 5 percent | 566 |
| 50 percent | 602 |
| Overhead at 620° F., percent | 71 |

It will be noted that this feed stock had an initial boiling point of 275° C. at 10 mm., which is equivalent to 435° C. at atmospheric pressure, and 50% of this feed stock distilled at a temperature equivalent to 485° C. at atmospheric pressure.

The feed was treated in three comparative runs in the same equipment as described before. One run (run 17) was conducted in the absence of oxygen in order to determine the extent of thermal cracking taking place at the temperature level investigated. Two other runs were conducted at approximately the same temperature at oxygen/petrolatum mole ratios of 1.1 (run 18) and 2.5 (run 19). In all three runs a small proportion of steam, within the range of about 2 to 10 percent based on feed, was added with the petrolatum to assure complete vaporization of the feed in the preheater coil and the reaction zone. Of course, other inert diluent gases such as nitrogen may be added instead of steam to aid in vaporizing the feed and, if desired, to moderate the oxidation reaction. Depending on the volatility of the feed and the dilution effect desired, as much as 30 percent or more of inert diluent gas may accordingly be added with the hydrocarbon feed.

The process data are summarized in Table VII while Table VIII summarizes distillation data for the degassed organic layer products obtained from the respective runs. Each distillation was conducted to a final boiling point approximately equal to the initial boiling point of the petrolatum feed.

Table VII

HIGH TEMPERATURE OXIDATION OF PETROLATUM

| Run No. | 17 | 18 | 19 |
|---|---|---|---|
| Average reaction temp., °C | 540 | 545 | 562 |
| Oxygen/petrolatum mole ratio | | 1.1 | 2.5 |
| Item pounds oxygen consumed per 100 pounds petrolatum charged | | 8.4 | 19.2 |
| Solids used for heat removal (fused alumina) | (1) | (1) | (1) |
| Solids rate, lbs./hr | 30 | 30 | 30 |
| Solids rate, lbs/1000 g. feed | 34 | 26 | 42 |
| Solids rate, lbs./g. mole oxygen | | 10 | 7 |
| Steam dilution, grms./1,000 g. feed | 44 | 34 | 57 |
| Recovery data: Weight percent C., H.O based on HC, O₂ and H₂O feeds | 97.0 | 97.0 | 97.0 |
| Conversion to products boiling below I.B.P. of feed, percent of feed | 43.9 | 77.2 | 88.9 |
| Production data, basis 100 pounds petrolatum feed: | | | |
| Liquid organic material ("A"), stabilized to room temp., lbs | 81.2 | 70.8 | 66.4 |
| Light ends (mostly butylenes), pounds | 2.2 | 11.6 | 9.5 |
| Ethylene, pounds | 2.6 | } 9.0 { | 9.9 |
| Propylene, pounds | 3.7 | | 5.9 |
| CO, pounds | | 2.7 | 7.3 |
| CO₂, pounds | | 0.7 | 2.2 |
| Saturates, pounds | 4.3 | 3.9 | 5.5 |
| n of saturates | 1.7 | 1.5 | 1.5 |
| Total C+H in non-cond. gas, pounds | 10.7 | 14.3 | 25.0 |

¹ Size 240–300 microns.

It is noted that in the absence of oxygen (run 17) about 44 percent of the petrolatum was converted to materials boiling below the initial boiling point of the feed. With suitable amounts of oxygen added, this conversion can be readily made as high as 70 or 90 percent or even higher, as shown in runs 18 and 19. Of course, the reported conversion figures are only approximate since the material boiling within the range of the original feed also contains some olefins, oxy-compounds, etc. formed during the oxidation reaction. The production of ethylene, propylene and other light ends is more than doubled in the oxidation runs as compared with thermal cracking run; ethylene production is almost quadrupled in run 19 as compared with run 17.

Table VIII

DISTILLATION OF DEGASSED ORGANIC MATERIAL ("A")

| Run No. | 17 | 18 | 19 |
|---|---|---|---|
| Total distilled at— | | | |
| 60° C./760 mm., percent | 4.0 | 7.6 | 8.0 |
| 100° C./760 mm., percent | 6.9 | 17.5 | 18.5 |
| 200° C./760 mm., percent | 12.0 | 33.0 | 40.0 |
| 300° C./760 mm., percent | 19.0 | 50.0 | 58.0 |
| 435° C./760 mm., percent | 40.0 | 74.0 | 82.0 |

Actually the distillations were conducted at atmospheric pressure up to temperatures of about 150° C., whereupon the pressure was reduced to about 0.2 mm. Hg and the distillation continued. The distillation temperatures obtained at the reduced pressure were then converted to the corresponding estimated atmospheric distillation temperatures. Thus, for instance, a boiling point at 42° C./0.2 mm. is estimated to equal 245° C./760 mm., 125° C./2 mm. approximately equals 350° C./760 mm., etc.

In all cases the several fractions were found to have a refractive index $n_D^{20}$ ranging from about 1.39 for the fractions boiling below about 60° C. and gradually increasing to 1.46, 1.47 or 1.48. Fractions of approximately the same boiling range appeared to have the lowest refractive index in the non-oxidative run 17 and somewhat higher indices in runs 18 and 19. The bromine number of material boiling up to about 150° C. was in all three cases in the range of about 150 to 350 g. Br per 100 gr., being lowest in run 17 and highest in run 19. The fractions boiling above about 150° C. had bromine numbers of about 100 g. Br/100 g., except that the fractions from runs 18 and 19 boiling above about 350° C./760 mm. had bromine numbers in the range of about 60 to 70 g. Br/100 g., whereas the analogous fractions from run 17 had a bromine number of about 107. This difference is undoubtedly due to a substantial concentration of oxygenated products in the high boiling fractions in runs 18 and 19.

EXAMPLE 8

The major products resulting from the high temperature partial oxidation and dehydrogenation of 99% ethylbenzene and 99% isopropylbenzene are styrene, alpha-methyl styrene, acetophenone and benzaldehyde. The results obtained from the high temperature oxidation of these alkylbenzenes using 300 micron fused zircon silica solids are summarized in Table IX.

Table IX

VAPOR PHASE OXIDATION OF ETHYLBENZENE AND ISOPROPYLBENZENE AT ATMOSPHERIC PRESSURE

| | Ethylbenzene | | | Isopropylbenzene | |
|---|---|---|---|---|---|
| Run No. | 20 | 21 | 22 | 23 | 24 |
| Feed conversion, percent | 38.5 | 32.6 | 45 | 43 | 58 |
| Oxygen conversion, percent | 79.4 | 72.1 | 97.5 | 81.9 | 96.0 |
| Oxygen/feed mole ratio (based on O₂ charged) | 0.77 | 0.70 | 0.70 | 0.75 | 0.74 |
| Lb. O₂/100 lb. of hydrocarbon feed (based on O₂ consumed) | 23.1 | 15.3 | 20.4 | 16.4 | 18.8 |
| Contact time, seconds | 5 | 5 | 4 | 5 | 5 |
| Solids rate, lb./G-mole O₂ reacting | 14.5 | 16.0 | 10.0 | 14.3 | 10 |
| Average reaction temp., °C | 540 | 530 | 590 | 525 | 560 |
| Charge data: | | | | | |
| Feed charged, grams | 785 | 853 | 1,949 | 906 | 515 |
| Oxygen charged, grams | 181 | 181 | 408 | 181 | 101 |
| Water as solids lift, grams | 1,799 | 1,788 | 2,632 | 1,837 | 760 |
| Duration of experiment, minutes | 120 | 120 | 250 | 120 | 70 |
| Product data: | | | | | |
| Organic layer, grams | 683 | 790 | 1,775 | 813 | 447 |
| Water layer (total), grams | 1,890 | 1,897 | 2,712 | 1,935 | 780 |
| C.H.O. in non-cond. gas, grams | 142 | 113 | 435 | 109 | 96 |
| Vol. of dry gas at S.T.P., cu. ft. | 4.1 | 3.6 | 12.5 | 3.1 | 2.5 |
| Analytical data on organic layer carbonyls (g. O₂/100 G sample) | 1.2 | 1.2 | 2.0 | 2.1 | 3.6 |
| Bromine number (G.BR₂/100 G sample) | 35 | 33 | 49 | 41 | 53 |
| Solubility in 85% H₃PO₄, vol. percent | 8.5 | 6.5 | 8 | 19 | |
| Yield data, pounds per 100 lbs. of feed reacting: | | | | | |
| Styrene | 59.1 | 62.4 | 57.1 | 15.3 | 22.2 |
| Alpha methylstyrene | | | | 29.0 | 33.9 |
| Acetophenone | 4.8 | 8.3 | 5.8 | 18.2 | 16.5 |
| Benzaldehyde | 12.2 | 14.2 | 9.3 | 3.4 | 2.1 |
| Benzene | 3.6 | 2.4 | 8.6 | 1.3 | } 6.8 |
| Toluene | 2.0 | 1.2 | | 7.6 | |
| Others | 5.6 | 5.4 | 10.1 | 20.8 | 14.6 |

As the above data show styrene, alpha methylstyrene, acetophenone and benzaldehyde are the principal products of the oxidations at atmospheric pressure. At elevated pressures, e.g. 50 to 100 p.s.i.g., the reaction is more rapid, it occurs at somewhat lower temperatures and oxygenated compounds are the predominant products.

When a dialkylated aromatic such as diethylbenzene or diisopropylbenzene is oxidized as above the major products consist of monoalkenyl derivatives. For example, diethylbenzene is largely converted to ethyl vinyl benzene but also gives some ethyl acetophenone and some ethylbenzaldehyde. Similarly, diisopropylbenzene gives isopropylstyrenes (isopropylstyrene and isopropyl alpha methylstyrene) and in addition some isopropylacetophenone and isopropylbenzaldehyde. In the case of the run using diisopropylbenzene as feed, the quantities of styrenes and oxygenated compounds produced amounted to 60.7 pounds and 12 pounds, respectively, on a basis of 100 pounds of diisopropylbenzene reacting.

In other runs mixtures of hexane and benzene were oxidized under similar conditions. In these runs hexane was preferentially attacked under all conditions tested, benzene being practically inert at low temperatures, such as 400° C., and becoming more reactive as the reaction temperature was raised. The benzene that reacted formed some light unsaturated compounds, e.g. ethylene, and substantial amounts of carbon dioxide and water. This further confirms that the present invention is of primary interest for upgrading methylenic feeds such as alkanes, alkenes, cycloalkanes, alkylaromatics and various oxygenated compounds derived therefrom, but simple aromatics such as benzene and toluene are useful feeds in certain instances.

Various general conclusions can be drawn from the foregoing data relative to the vapor phase oxidation of hydrocarbons at temperatures above 500° C. in the presence of raining solids or under other conditions providing equally effective temperature control. Thus it appears that in the case of all methylenic feeds tried, good yields of aromatic olefins or light olefins can be obtained. The amount of carbon dioxide produced amounted approximately to 2 to 10 lbs. per 100 lbs. of feed reacting. The production of carbon monoxide was greatest for cycloaliphatic feeds (cyclohexane), ethylbenzene, n-hexane, octene-2, cetane and gas oil, in that order. Cyclohexane and octene-2 gave larger amounts of oxygenated material than did any of the alkanes. The olefin feed (octene-2) gave the greatest amount of diolefins, followed by cyclohexane and cetane in that order. Octene and cyclohexane also differed significantly from hexane and cetane in that the former two hydrocarbons gave some aromatics as products.

Having described the general nature and scope of the invention and having illustrated its operation in terms of various specific examples, the novelty hereof is particularly pointed out in the appended claims.

What is claimed is:

1. A process for oxidizing a methylenic hydrocarbon feed having 2 to 30 carbon atoms per molecule and at least 25% of these carbon atoms in the form of methylenic groups, which comprises mixing said hydrocarbon with an oxygen-containing gas such that the mole ratios of total free oxygen to total oxidizable feed exceed about 0.3, passing the mixture through a reaction zone at an average elevated temperature between about 500° and 750° C., also passing through the reaction zone relatively cool finely divided inert solids evenly dispersed throughout the reaction zone in a concentration of about 0.05 to 10.0 volume percent of solids per volume of reaction space and sufficient to maintain the reaction space throughout at a temperature below 750° C., the mixture being passed through the reaction zone at a rate such that the residence time of the mixture at the elevated temperature is between 1 and 20 seconds, and separating oxygenated and unsaturated compounds from the oxidized mixture.

2. A process for oxidizing a methylenic hydrocarbon feed having 2 to 30 carbon atoms per molecule and at least 25% of these carbon atoms in the form of methylenic groups, which comprises mixing said hydrocarbon with an oxygen-containing gas such that the mole ratios of total free oxygen to total oxidizable feed are about 0.5 to 5, passing the mixture through a reaction zone at an average elevated temperature between about 500° and 750° C., also passing through the reaction zone in a free fall condition relatively cool finely divided inert solids evenly dispersed throughout the reaction zone in a concentration of about 0.05 to 10.0 volume percent of solids per volume of reaction space and sufficient to maintain the reaction space throughout at a temperature below 750° C., the mixture being passed through the reaction zone at a rate such that the residence time of the mixture at the elevated temperature is between 1 and 20 seconds, and separating oxygenated and unsaturated compounds from the oxidized mixture.

3. A process according to claim 2 wherein the methylenic hydrocarbon is an alkyl aromatic having at least 2 carbon atoms in each alkyl group.

4. A process according to claim 3 wherein each alkyl group contains 2 to 3 carbon atoms.

5. A process according to claim 2 wherein the methylenic hydrocarbon is ethylbenzene.

6. A process according to claim 2 wherein the average temperature in the reaction zone is between about 520° and 650° C.

7. A process for oxidizing a methylenic hydrocarbon feed having 2 to 30 carbon atoms per molecule and at least 30% of these carbon atoms in the form of methylenic groups, which comprises mixing said hydrocarbon at several intervals with an oxygen-containing gas such that local mole ratios of free oxygen to oxidizable feed are about 0.1 to 0.5, passing the mixture upwardly through a reaction zone at an average elevated temperature between about 520° and 650° C., also passing through the reaction zone in a free fall condition relatively cool finely divided inert solids evenly dispersed throughout the reaction zone in a concentration of about 0.05 to 10.0 volume percent of solids per volume of reaction space and sufficient to maintain the reaction space throughout at a temperature below 650° C., the mixture being passed through the reaction zone at a rate such that the residence time of the mixture at the elevated temperature is between 1 and 10 seconds, and separating unsaturated compounds from the oxidized mixture.

8. A process according to claim 7 wherein the inert solids have a particle size of about 250 to 500 microns and are circulated through the reaction zone countercurrently to the feed vapors in a ratio of about 5 to 50 lbs. per pound of hydrocarbon feed.

9. A process according to claim 7 wherein the oxygen containing gas is substantially pure oxygen and is added to the reaction zone in a ratio of about 0.5 to 5 moles total per mole of hydrocarbon feed.

10. A process according to claim 9 wherein the feed hydrocarbon is a $C_2$ to $C_{16}$ paraffin.

11. A process according to claim 9 wherein the feed is a $C_5$ to $C_{10}$ naphthene having a 5- to 6-membered ring.

12. A process according to claim 9 wherein the feed is a naphtha.

13. A process according to claim 9 wherein the feed is a petrolatum mixed with sufficient steam to be volatile at the reaction temperature.

14. A process according to claim 9 wherein the average temperature in the reaction zone is between 520° and 590° C.

References Cited in the file of this patent

UNITED STATES PATENTS

| | | |
|---|---|---|
| 1,808,168 | Hopkins | June 2, 1931 |
| 2,370,541 | James | Feb. 27, 1945 |
| 2,674,612 | Murphee | Apr. 6, 1954 |
| 2,725,344 | Fenske et al. | Nov. 29, 1955 |
| 2,752,407 | Cahn | Jan. 26, 1956 |
| 2,793,987 | Brown et al. | May 28, 1957 |
| 2,824,148 | Kevlemans et al. | Feb. 18, 1958 |
| 2,833,837 | Berg | May 6, 1958 |
| 2,846,360 | Johnig | Aug. 5, 1958 |